Aug. 7, 1951          A. S. LEVIN          2,563,253
WARMING TABLE
Filed Jan. 23, 1948
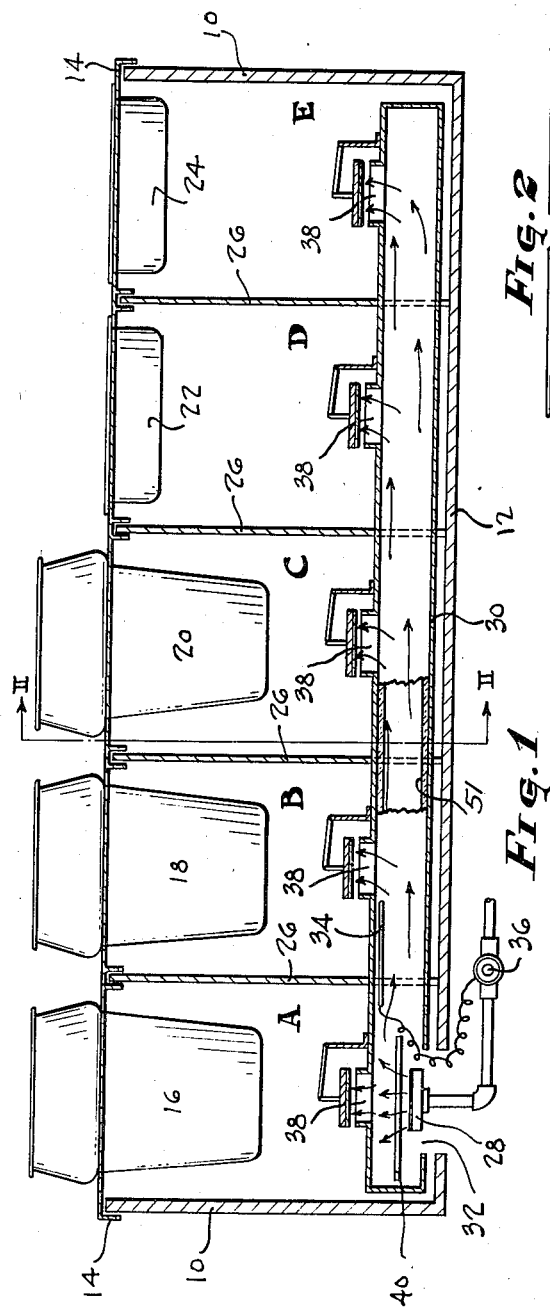
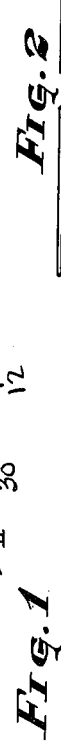
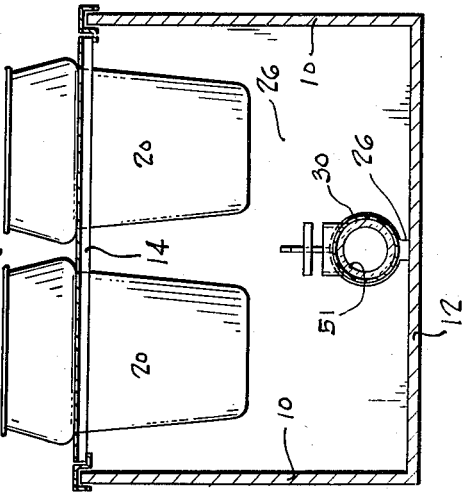
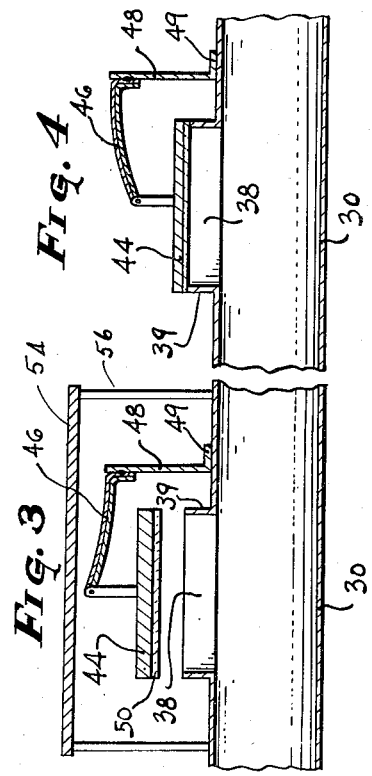
INVENTOR.
ABRAHAM S. LEVIN
BY
*Louis Necko*
ATTORNEY Patented Aug. 7, 1951

2,563,253

UNITED STATES PATENT OFFICE 2,563,253

WARMING TABLE

Abraham S. Levin, Philadelphia, Pa.

Application January 23, 1948, Serial No. 3,980

4 Claims. (Cl. 126—376)

My invention relates to a warming table of the type used for keeping cooked foods warm while the same are being stored or served.

One object of the invention is to produce an improved table of the type set forth.

Different foods are best kept at different temperatures. For example, soups, stews, and other fairly liquid foods are best maintained at relatively high temperatures. Meats, mashed potatoes, and other, fairly solid foods, are best maintained at relatively low temperatures to prevent them from drying out.

It is therefore a further object of the invention to produce an improved warming table whereby a number of different foods may be maintained at different temperatures in a simple, inexpensive and automatically operating apparatus.

These, and other objects are attained by my invention as set forth in the following specification and as shown in the accompanying drawings in which:

Fig. 1 is a view, partly in section and partly in elevation, of a warming table embodying my invention.

Fig. 2 is a section on line 2—2 on Fig. 1.

Figs. 3 and 4 are enlarged, fragmentary views showing details of structure and the manner of operation.

The warming table illustrated includes a cabinet-like structure having side walls 10, a bottom wall 12 and a detachable cover or top wall 14. The top wall 14 is provided with a number of openings for permitting a number of utensils 16, 18, 20, 22 and 24 to depend into the cabinet while being supported by the top wall 14 of the cabinet. The cabinet interior is divided by partitions 26 into compartments A, B, C, D, and E, corresponding to the utensils, or groups of utensils to be warmed, as shown in Figs. 1 and 2.

In order to heat the various compartments, I provide a source of heat such as a gas burner 28 which is inserted into one end of an elongated conduit 30 through a bottom opening 32. The temperature in the vicinity of the burner is regulated by a thermostat 34 which controls a valve 36 to regulate the supply of gas to the burner.

In the top wall of the conduit 30 I provide a number of openings 38 each of which is surrounded by a wall or collar 39 whereby passages are formed through which the hot products of combustion enter the various compartments. A baffle, or diffuser plate 40 is preferably positioned above the burner so as to prevent overheating of compartment A directly above the burner and to deflect the products of combustion into the other portions of the conduit.

By the arrangement thus far described, the various compartments may be said to receive heat in inverse ratio to their respective distances from the burner. For example, if the thermostat 34 is set to maintain the temperature in the vicinity of the burner at about 200 degrees F., the temperature in compartment A will be about 200 degrees F. and the temperatures in compartments B, C, D and E will be progressively lower. In use, the more liquid foods are placed in utensils 16, 18 and, possibly 20, and the more solid foods are placed in the utensils further away from the source of heat, such as utensils 22 and 24. In this way, the more fluid foods are kept sufficiently hot and the more solid foods are kept sufficiently warm, without being dried out.

If it is desired to effect more exact regulation of the temperatures in the various compartments, I provide each of the openings 38 with a cover 44 carried by a heat responsive member, such as thermostat 46 for moving the cover to closing or non-closing position relative to its corresponding opening 38. The thermostats 46 are carried by brackets 48 which are secured to the top of the conduit 30 as at 49. The various thermostats 46 are set or calibrated to curve upwardly, so as to move the covers 44 to non-obstructing position when the temperatures in their respective compartments fall to predetermined low values, and to curve downwardly, to move the covers to closing positions with reference to the openings 38 when the temperatures in the compartments reach predetermined high values. The thermostats operate independently, each in response to the temperature in its vicinity, and the thermostat in compartment A is set to close the corresponding opening at a predetermined high temperature value, while the thermostat of the compartment most remote from the burner (compartment E), is set to close the corresponding opening at a predetermined low temperature value. The thermostats of the intervening compartments will be set to operate at corresponding intermediate values.

By my invention, I obviate the necessity of using water jackets, as has been customary, and I obviate the necessity of using a number of individual burners, one for each compartment, with a control for each burner. Also, a table constructed as above set forth, will heat up rapidly as compared with a warming table employing hot water, and my table operates more economically than one using hot water because, when hot water is used, all the heat stored in the water will be lost when the table is not in use, as for example when operations are shut down overnight. Furthermore, my apparatus is light and inexpensive to make because it can be built of light sheet metal without the necessity of fittings, valves or water or steam tight connections.

The undersides of the covers 44 may be provided with insulating pads 50, as shown in Fig. 3, so as to minimize heat absorption by the covers and so as to make the thermostats more truly responsive to the temperatures of their respective compartment.

Also, the conduit 30 may be insulated as shown in Fig. 2, but, because the insulation 51 is rough and absorbent, it is placed inside of the conduit instead of on the outer surface thereof. This makes it possible easily to wash or wipe down the exterior of the conduit from time to time and protects the insulation from contact with any food which may spill from the utensils thereabove.

The thermostats and their adjuncts, as well as the openings 38, may be protected against possible food spillage, by covers 54 carried by legs 56 and resting on, or secured to, the conduit 30 as shown in Fig. 3.

What I claim is:

1. A warming table including a cabinet divided into a plurality of compartments having openings in the walls thereof for insertion thereinto of a number of utensils, a conduit extending through the lower portions of said compartments and having a bottom opening near one end thereof, the other end of said conduit being closed, a burner disposed in said opening and operable to discharge dry, hot products of combustion into said conduit, wall structures defining passages having substantially uniform flow capacities for conducting the hot products of combustion from said conduit into the respective compartments, said passages being successively increasingly spaced from said burner progressively to decrease the hot products of combustion entering the respective compartments in the order of their proximity to said burner.

2. The structure recited in claim 1 together with individual closures for said passages, hinge means mounting said closures near the discharge ends of the said passages and outside said conduit, means for moving said closures to a first position in which said closures abut said wall structure and close said passages and to a second non-closing position in which said closures do not contact said wall structures, and heat insulating means on the sides of the closures which abut the passages.

3. The structure recited in claim 1 together with individually operable closures for said passages, and individually operable means responsive to the ambient temperatures in the respective compartments for individually moving said closures to closing or non-closing positions relative to said passages to regulate the flow of the products of combustion into said compartments.

4. The structure recited in claim 1, together with heat insulating means on the inside of said conduit for minimizing heat transmission directly from said conduit to the interiors of said compartments.

ABRAHAM S. LEVIN.

REFERENCES CITED

The following references are of record in the file of this patent:

UNITED STATES PATENTS

| Number | Name | Date |
| --- | --- | --- |
| 129,565 | Howard | July 16, 1872 |
| 194,288 | Bock | Aug. 21, 1877 |
| 252,884 | Linney | Jan. 31, 1882 |
| 492,195 | Doty | Feb. 21, 1893 |
| 814,074 | Pierce | Mar. 6, 1906 |
| 1,213,772 | McCown | Jan. 23, 1917 |
| 1,217,880 | Robbins | Feb. 27, 1917 |
| 1,425,371 | Desmarest | Aug. 8, 1922 |
| 1,637,143 | Fraser | July 26, 1927 |

FOREIGN PATENTS

| Number | Country | Date |
| --- | --- | --- |
| 33,916 | Switzerland | May 27, 1905 |